(12) United States Patent
Ikarashi et al.

(10) Patent No.: US 9,441,643 B2
(45) Date of Patent: Sep. 13, 2016

(54) HYDRAULIC OIL STORAGE DEVICE AND INJECTION MOLDING DEVICE

(71) Applicants: MITSUBISHI HEAVY INDUSTRIES PLASTIC TECHNOLOGY CO., LTD., Nagoya-shi, Aichi-ken (JP); MITSUBISHI HEAVY INDUSTRIES, LTD., Tokyo (JP)

(72) Inventors: Masaaki Ikarashi, Nagoya (JP); Mamoru Kawasaki, Nagoya (JP); Yuichi Hosoi, Nagoya (JP); Toshihiko Kariya, Nagoya (JP); Yoshinao Komatsu, Tokyo (JP)

(73) Assignees: MITSUBISHI HEAVY INDUSTRIES, LTD., Tokyo (JP); MITSUBISHI HEAVY INDUSTRIES PLASTIC TECHNOLOGY CO., LTD., Nagoya-shi (JP)

( * ) Notice: Subject to any disclaimer, the term of this patent is extended or adjusted under 35 U.S.C. 154(b) by 323 days.

(21) Appl. No.: 13/627,289

(22) Filed: Sep. 26, 2012

(65) Prior Publication Data

US 2013/0220459 A1   Aug. 29, 2013

(30) Foreign Application Priority Data

Feb. 27, 2012   (JP) .................................. 2012-040000

(51) Int. Cl.
*F15B 1/26* (2006.01)
*B29C 45/03* (2006.01)
*B65D 25/00* (2006.01)

(52) U.S. Cl.
CPC ................. *F15B 1/26* (2013.01); *B29C 45/03* (2013.01); *B65D 25/00* (2013.01); *Y10T 137/86187* (2015.04)

(58) Field of Classification Search
CPC .................................. B65D 25/00; F15B 1/26
USPC ............................ 137/571, 574; 60/453, 469
See application file for complete search history.

(56) References Cited

U.S. PATENT DOCUMENTS 1,387,013 A *   8/1921   Robinson .................... 137/571
3,705,626 A *  12/1972   Glenn et al. ................. 166/267
(Continued)

FOREIGN PATENT DOCUMENTS

JP          51-35869 A    3/1976
JP          61-164899 U  10/1986
(Continued)

OTHER PUBLICATIONS

Office Action dated Aug. 25, 2015, issued in counterpart Japanese Patent Application No. 2012-040000, with English translation (4 pages).

*Primary Examiner* — John K Fristoe, Jr.
*Assistant Examiner* — Christopher Ballman
(74) *Attorney, Agent, or Firm* — Westerman, Hattori, Daniels & Adrian, LLP (57) ABSTRACT

A hydraulic oil storage device and an injection molding device are provided with a connection box that partitions a storage region of a sub-tank into a first region that includes a flow channel opening portion for a coupling tube and a second region other than the first region, in which the connection box is provided with an internal region communication portion that brings the first region and the second region into communication, and causes a pressure loss equal to the pressure loss of the coupling tube, or a pressure loss greater than that pressure loss, and a return tube is connected to the sub-tank so that the flow channel outlet faces the first region.

11 Claims, 5 Drawing Sheets

(56) References Cited

U.S. PATENT DOCUMENTS

| | | | |
|---|---|---|---|
| 3,960,174 A * | 6/1976 | Latimer et al. | 137/563 |
| 4,210,176 A * | 7/1980 | Emming | 137/573 |
| 4,272,379 A * | 6/1981 | Pollock | 210/621 |
| 5,203,677 A * | 4/1993 | Lix et al. | 417/12 |
| 5,778,922 A * | 7/1998 | Schoultz | 137/208 |
| 2004/0216783 A1* | 11/2004 | Rumpf | 137/571 |
| 2010/0006577 A1* | 1/2010 | Koshino | 220/501 |
| 2010/0051123 A1* | 3/2010 | Wiens et al. | 137/565.01 |

FOREIGN PATENT DOCUMENTS

| | | |
|---|---|---|
| JP | 3-503261 A | 7/1991 |
| JP | 5-34324 Y2 | 8/1993 |
| JP | 5-66206 U | 9/1993 |
| JP | 2010-19157 A | 1/2010 |
| JP | 4582807 B2 | 11/2010 |

\* cited by examiner

HYDRAULIC OIL STORAGE DEVICE AND INJECTION MOLDING DEVICE

BACKGROUND OF THE INVENTION

1. Field of the Invention

The present invention relates to a hydraulic oil storage device, and an injection molding device. Priority is claimed on Japanese Patent Application No. 2012-040000, filed Feb. 27, 2012, the content of which is incorporated herein by reference.

2. Description of Related Art

Conventionally, with regard to large-scale injection molding devices, devices are known that can be separated into injection units and mold clamping units in order to simplify transport and assembly.

In the case of the aforementioned large-scale injection molding device, a storage tank for hydraulic oil and a pump that pumps the hydraulic oil are arranged at the injection unit side for convenience of an installation space. In the large-scale injection molding device, the hydraulic oil that is pumped by this pump is supplied to hydraulic cylinders that are control elements provided at the injection unit and the mold clamping unit. Then, the hydraulic oil that is discharged from each hydraulic cylinder is returned to the storage tank via individual return pipes so that the mutual back pressures do not exert an adverse effect on the hydraulic control.

For that reason, many return pipes that return to the injection unit side the hydraulic oil sent to the mold clamping unit side are arranged between the injection unit and the mold clamping unit. That is to say, with regard to the tube arrangement, a complicated layout resembling a maze is required that must concentrate all the tubing in a narrow space on the injection unit side. For this reason, the design of a large-scale injection molding device has been limited to veteran designers skilled in tubing design. Also, due to the work of connecting the tube joints in a large-scale injection molding device, the assembly work of the large-scale injection molding device has become cumbersome.

Therefore, in order to reduce the number of tubes running between the injection unit and the mold clamping unit, there is known a structure that provides a main tank on the injection unit side, and provides a sub-tank on the mold clamping unit side, and that brings the main tank and the sub-tank into communication with a coupling tube. That is to say, a structure is adopted that couples return pipes that return hydraulic oil from the mold clamping unit to the sub-tank that is provided on the mold clamping unit side, rather than directly connecting them to the main tank that is provided on the injection unit side. By doing so, the hydraulic oil that is pumped to the mold clamping unit can be returned to the main tank via the coupling tube after being once returned to the sub-tank, and so it is possible to reduce the number of tubes that are arranged between the injection unit and the mold clamping unit.

However, with regard to the sub-tank that is provided at the mold clamping unit, only a sub-tank that is smaller than the main tank can be arranged due to the circumstances of the installation space. On the other hand, since the mold clamping unit has a hydraulic cylinder such as a mold clamping cylinder or mold opening/closing cylinder that requires a large flow of hydraulic oil, a large flow of hydraulic oil is returned from the hydraulic cylinder to the sub-tank. Since the movement of hydraulic oil from the sub-tank to the main tank is due mainly to a pressure fluctuation with the main tank accompanying a rise in the sub-tank fluid level, in the case of hydraulic oil flowing in at a high pressure and high flow rate, the movement of the hydraulic oil to the main tank does not keep up with the oil level rise of the sub-tank, and so there has been the possibility of hydraulic oil overflowing from an air breather or the like that is provided at the upper surface of the sub-tank.

Japanese Examined Utility Model Application, Second Publication No. H05-34324 proposes technology that effectively utilizes hydraulic oil that is discharged from a return tube to speed up the flow of the hydraulic oil in the coupling tube, by inserting a flow channel outlet of the return tube with a high hydraulic oil flow rate into the coupling tube that couples the main tank and the sub-tank.

Figure 5:
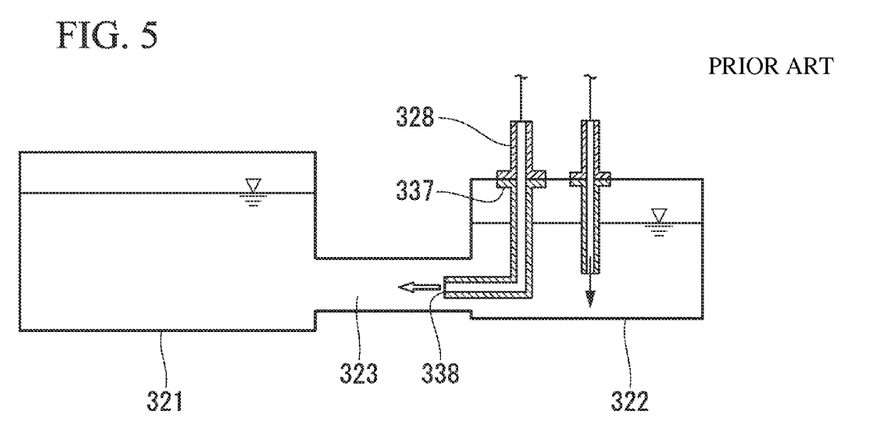
FIG. 5 is a drawing that corresponds to FIG. 2 in a conventional hydraulic oil storage device.

However, in the case of inserting the flow channel outlet of a return tube into the coupling tube in the above manner, in order to sufficiently carry hydraulic oil through the coupling tube, it is necessary to make the return tube diameter (tube opening surface area) approximate the coupling tube diameter. For that reason, due to having a constitution that practically inserts only one return tube into one coupling tube, in the case of a plurality of return tubes being connected to the sub-tank, a plurality of coupling tubes of the same number as the return tubes are required, and so the parts count and assembly time increase. Moreover, as shown in FIG. 5, by forming the distal end side of the return tube 328 bent approximately 90° to the horizontal direction, in the state of the return tube 328 attached to the lid of the sub-tank, it is not possible to insert the return tube 328 in the coupling tube 323 just by attaching the lid of the sub-tank from above. For this reason, when attaching the return tube 328, a worker enters the interior of the sub-tank 322 and, after inserting the distal end of the return tube 328 in the interior of the coupling tube 323, a procedure to fasten the attachment end portion of the return tube 328 to the lid of the sub-tank from the inner side becomes necessary.

Also, when guiding the return tube 328 into the interior of the sub-tank 322 from above the sub-tank 322, in order to insert the flow channel outlet 338 of the return tube 328 into the interior of the coupling tube 323 that extends in a lateral direction, it is necessary to elongate the return tube 328 until the coupling tube 323 that is provided in the vicinity of the bottom surface of the sub-tank 322. Along with that, it is necessary to form the return tube 328 in a bent tube shape within the sub-tank 322. For that reason, due to the discharge reaction force of the hydraulic oil from the flow channel outlet 338, there is a possibility of a bending moment acting on the return tube 328, and excessive vibration being induced by a vortex that occurs at the periphery of the flow channel outlet 338. Also, there is a possibility of the load on fixing members such as the flange 337 of the return tube 328 increasing due to the bending moment and breakage occurring, screws for fastening coming loose from the vibration, and the screws breaking.

Moreover, in the case of leading the return tube 328 to inside the coupling tube 323, due to the drop in pressure that occurs at the space between the outer diameter of the return tube 328 and the inner diameter of the coupling tube 323 due to the Venturi effect of the hydraulic oil that is discharged from the return tube 328, air bubbles are generated in the vicinity of the flow channel outlet 338. In the case of these air bubbles reaching the hydraulic pump, there is a possibility of the hydraulic pump breaking down due to the occurrence of cavitation.

Furthermore, since the return tubes 328 are individually connected to the sub-tank 322 for each control element, due to differences in the flow amount and pressure of the hydraulic oil that flows in, the oil level in the sub-tank 322 undulates and so is not steady. For that reason, pressure fluctuations of the hydraulic oil occur particularly in the vicinity of the coupling tube 323 in the sub-tank 322, and the pressure fluctuations in the vicinity of the coupling tube 323 affect the hydraulic oil of the main tank 321 as pulsations, leading to the possibility of hydraulic control becoming unstable.

SUMMARY OF THE INVENTION

This invention has as its object to provide a hydraulic oil storage device that is capable of returning hydraulic oil from a return tube to a main tank in a stable manner via a sub-tank while lessening the burden on workers engaged in assembly, and the load on fixing members that fix the return tube, and an injection molding device that is provided with this hydraulic oil storage device.

According to a first aspect of the present invention, a hydraulic oil storage device includes: a main tank being connected with a suction tube that suctions hydraulic oil; a sub-tank being connected with a return tube that returns the hydraulic oil suctioned by the suction tube; and one or a plurality of coupling tubes that connect the main tank and the sub-tank. The sub-tank is provided with a partition portion that partitions a storage region of the sub-tank into a first region that includes a flow channel opening portion for the coupling tube, and a second region other than the first region. The partition portion is provided with an internal region communication portion that brings the first region and the second region into communication, and causes a pressure loss equal to the pressure loss of the coupling tube or greater than that pressure loss. The return tube is connected to the sub-tank so that the flow channel outlet of the return tube faces the first region.

With the aforementioned constitution, the hydraulic oil of the main tank that is suctioned by the suction tube can flow into the first region of the sub-tank via the return tube. As a result of the main tank and the sub-tank being brought into communication by the coupling tube, it is possible to cause the hydraulic oil of the sub-tank to move to the main tank via the coupling tube by the pressure differential that arises in accordance with the heights of the oil level of the main tank and the oil level of the sub-tank.

Moreover, by partitioning the storage region of the sub-tank with the partition portion into a first region that includes a flow channel opening portion for the coupling tube, and a second region other than the first region, and constituting so as to cause hydraulic oil of the return tube to flow into the first region, the hydraulic pressure of the first region is raised with the flowing in of hydraulic oil, and by utilizing this rise in the hydraulic pressure, it is possible to speed up the flow velocity of the hydraulic oil that moves from the sub-tank to the main tank via the coupling tube.

In addition, since the pressure loss of the internal region communication portion is set to be the same as the pressure loss of the coupling tube or greater than that pressure loss, the hydraulic oil in the first region can be made to move to the second region via the internal region communication portion more gradually than the hydraulic oil of the sub-tank moving to the main tank via the coupling tube. For that reason, it is possible to cause comparatively small amounts of hydraulic oil that have overflown within the first region due to not being able to flow into the coupling tube to gradually move to the second region. Thereby, since it is possible to raise the oil level in the sub-tank in a gradual manner, and it is possible to prevent overflowing of the hydraulic oil from an air breather that is provided at the upper surface of the sub-tank.

Also, since the return tube is connected to the sub-tank so that the flow channel outlet faces to the interior of the first region, there is no need to bend the return tube, and it is possible to prevent a bending moment from acting on the return tube by the discharge reaction force of the hydraulic oil. Moreover, since it is possible to shorten the length of the return tube compared to the case of guiding the return tube to the inside of the coupling tube, even in the case of vibration being induced in the return tube by a vortex that is generated by discharge of the hydraulic oil, since it is possible to hold down to a minimum the bending moment due to the vibration, it is possible to prevent damage to fixing members such as the flange for the return tube, and screws for fastening.

Also, since the coupling tube is not arranged in the vicinity of the flow channel outlets of the return tube, in the event of hydraulic oil from the return tube being discharged, it is possible to suppress the occurrence of a drop in pressure due to the Venturi effect.

According to a second aspect of the present invention, in the hydraulic oil storage device according to the first aspect, the internal region communication portion is constituted from a plurality of holes that are formed in the partition portion.

By this kind of constitution, it is possible to reduce the flow velocity of hydraulic oil that moves from the first region to the second region within the sub-tank.

According to a third aspect of the present invention, in the hydraulic oil storage device according to the second aspect, the internal region communication portion is constituted so as to be provided in multiple stages between the first region and the second region.

By this kind of constitution, it is possible to prevent the generation of air bubbles caused by sudden drops in pressure when the hydraulic oil moves from the first region to the second region.

According to a fourth aspect of the present invention, in the hydraulic oil storage device according to the third aspect, the size of the plurality of holes that are provided in multiple stages between the first region and the second region is formed equivalent to the holes on the upstream side or smaller the further to the second region side.

By forming them in this way, within the sub-tank, it is possible to attenuate in stages the oscillatory waves of the hydraulic oil that is discharged to the first region. For that region, it is possible to prevent pulsation of the hydraulic oil due to propagation of oscillatory waves to the hydraulic oil in the sub-tank.

According to a fifth aspect of the present invention, in the hydraulic oil storage device according to any one aspect of the first through fourth aspects, a plurality of return tubes are provided, and among the plurality of return tubes, the flow channel outlets of the return tubes in which the flow amount of hydraulic oil is relatively great are arranged so as to face the interior of the first region.

By arranging them in this manner, the hydraulic oil of the return tubes in which the flow amounts are relatively large flow amounts readily maintains a high pressure in the first region. In contrast, it is possible to return the hydraulic oil of the return tube with a small flow amount to the second region in which there is little rise in the flow resistance and pressure. For that reason, it is possible to keep to a low level the back pressure of the control elements to which the return tubes with a small flow amount and low pressure are connected, and so it is possible to easily perform small flow amount control.

According to a sixth aspect of the present invention, in the hydraulic oil storage device according to the fifth aspect, the plurality of return tubes are integrally connected to a tube coupling member with higher rigidity than a wall portion of the sub-tank, and an upper portion opening of the sub-tank is constituted so as to be blocked by the tube coupling member.

By having such a constitution, in the state of the return tubes being attached to the tube coupling member, by attaching the tube coupling member to the sub-tank, it is possible to easy attach the return tubes to the sub-tank.

Also, since the return tubes are integrally connected to the tube coupling member having high rigidity, it is possible to prevent swinging of the return tubes by increasing the mounting rigidity of the return tubes.

According to a seventh aspect of the present invention, in the hydraulic oil storage device according to the sixth aspect, the tube coupling member is a hydraulic manifold.

By constituting in such a manner, it is possible to omit tubing that connects the hydraulic manifold and the sub-tank, and it is possible to reduce the number of tube joints.

Also, since the return tubes are attached to a hydraulic manifold that is a large metal block with high rigidity, the attachments of the return tubes are stable. For that reason, it is possible to prevent the occurrence in the return tubes of oscillation in which the return tubes interfere with adjacent tubes and the like, and oscillation such that looseness occurs in an attachment fastening portion.

By attaching the hydraulic manifold that is a heavy object to the sub-tank, it is possible to shift the natural frequencies of the sub-tank and the return tubes, which have natural frequencies that are comparatively low, to higher frequencies with a simple box structure, so it is possible to prevent sympathetic vibration with low-frequency pulsing that is generated from the flow of the hydraulic oil. Moreover, due to the weight of the hydraulic manifold, since it is possible to counter the discharge reaction force of the hydraulic oil that is discharged downward, it is possible to convert the repeated stress that occurs at the wall of the sub-tank into the compression stress side. Thereby, it is possible to hold down the tension stress that is generated at the walls of the sub-tank, and since avoiding the tension-compression mode that is less than the allowable stress at the fatigue strength becomes easy, it is possible to enhance the freedom degree in relation to strength design.

According to an eighth aspect of the present invention, an injection molding device includes the hydraulic oil storage device according to any one of the first to seventh aspects.

By having such a constitution, since the pulsation of the hydraulic oil is reduced, it is possible to cause control elements that are driven by hydraulic pressure to operate with high accuracy.

According to the hydraulic oil storage device and the injection molding device of the invention, it is possible to return hydraulic oil that is discharged from the return tube to the main tank in the stable manner via the sub-tank, while lessening the burden on workers engaged in assembly and the load on the fixing members that fix the return tube.

DETAILED DESCRIPTION OF THE INVENTION

Next, the hydraulic oil storage device 20 and the injection molding device 1 that is provided with the hydraulic oil storage device 20 in the first embodiment of the present invention shall be described with reference to the drawings.

Figure 1:
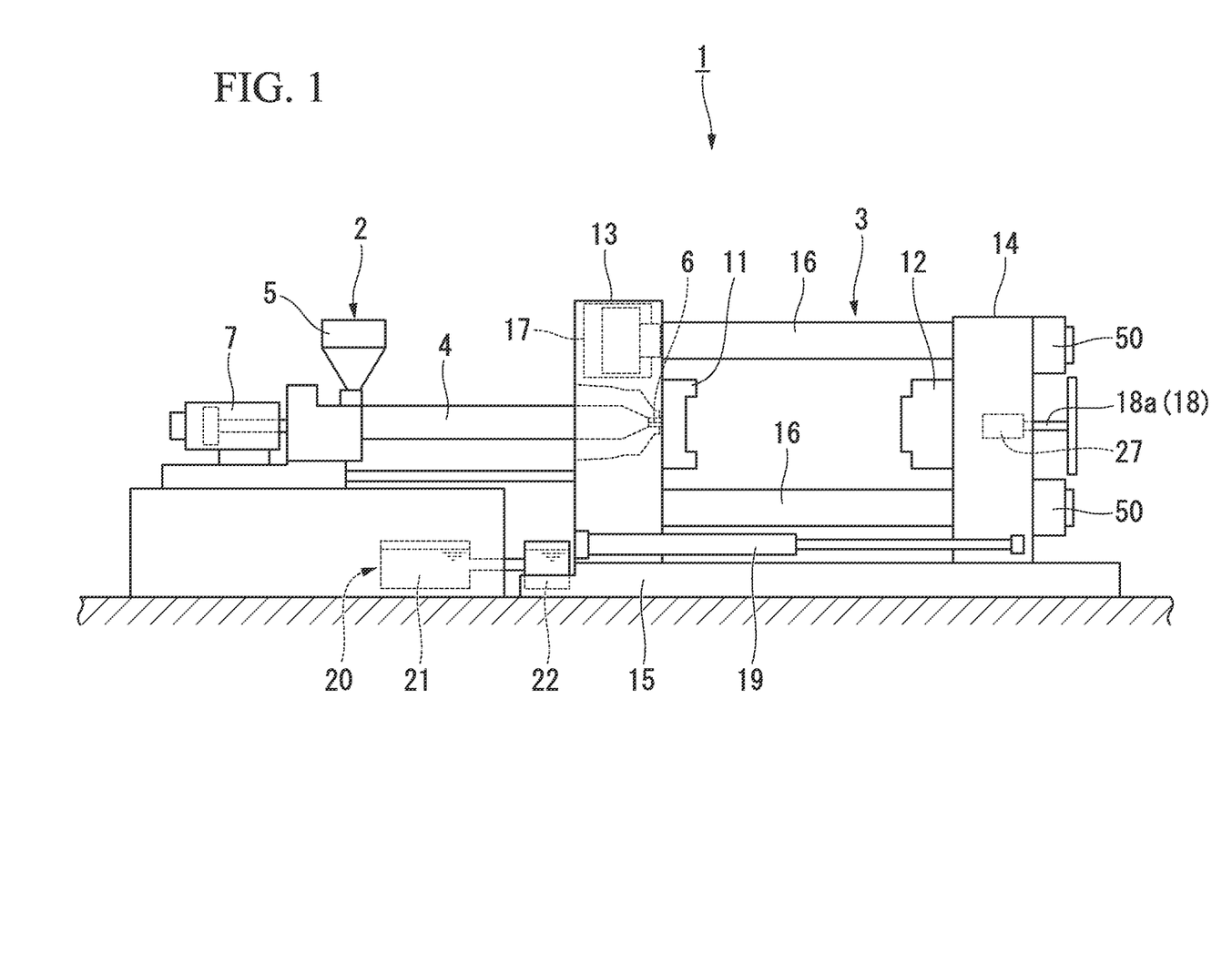
FIG. 1 is a side elevation showing the outline constitution of the injection molding device in the first embodiment of the present invention.

FIG. 1 is a configuration drawing that shows the outline constitution of the injection molding device 1 of this embodiment.

As shown in FIG. 1, the injection molding device 1 is provided with an injection unit 2 and a mold clamping unit 3.

In the injection unit 2, a heating cylinder portion 4 that heats a molding material and injects and fills it into a mold at a high pressure is provided in an extended manner in the horizontal direction, and a hopper 5 for charging the molding material is attached above a base portion side of this heating cylinder portion 4. Also, an injection nozzle 6 is formed at a first end of the heating cylinder portion 4 on the side of the mold clamping unit 3. A hydraulic cylinder 7 that is an actuator for pressing a screw (not shown) provided in the interior of the heating cylinder portion 4 to the mold clamping unit 3 side and a hydraulic motor not shown that rotationally drives the screw are attached to the second end of the heating cylinder portion 4 on the side opposite the injection nozzle 6. Note that the actuator that presses the screw to the mold clamping unit 3 side may be an electric motor-driven ball screw, or an electric actuator such as a linear motor. Also, a motor not shown that rotationally drives the screw may be an electric motor such as an inverter motor, a servo motor, an IPM motor or the like that is capable of rotation speed control.

The screw in the aforementioned heating cylinder portion 4 is rotationally driven by a hydraulic motor not shown, whereby a molding material that is charged in from the hopper 5 is slowly transported to the injection nozzle 6 side, and during this transportation the molding material is heated to be plasticized and melted. Then, when the screw is pressed to the mold clamping unit 3 side by the hydraulic cylinder 7, a compression force acts on the plasticized molding material, whereby the molding material is injected from the injection nozzle 6 to the mold interior of the mold clamping unit 3.

The mold clamping unit 3 is a device that performs opening/closing of the fixed mold 11 and a movable mold 12 that face each other. The fixed mold 11 is supported by a fixed mold platen 13 that is provided in a standing manner on the injection unit 2 side of the mold clamping unit 3. On the other hand, the movable mold 12 is supported by a movable mold platen 14 that is provided in a standing manner on the injection unit 2 side. The fixed mold platen 13 is supported in a fixed manner with respect to a base portion 15. The movable mold platen 14 is supported in a slidable manner along a guide (not shown) that is provided in an extended manner on the base portion 15.

A plurality of tie bars 16 that extend in the horizontal direction are provided between the fixed mold platen 13 and the movable mold platen 14. These tie bars 16 are provided with piston heads not shown at one end thereof. The end portion of each tie bar 16 that is provided with the piston head is fitted into a mold clamping cylinder 17 that is provided at the four corners of the fixed mold platen 13. Each tie bar 16 is constituted to be displacable in the extension direction thereof by this mold clamping cylinder 17.

Note that the present embodiment shows the example of the mold clamping cylinder 17 being provided at the four corners of the fixed mold platen 13, but the mold clamping cylinder 17 may also be a direct-pressure-type mold clamping cylinder that is arranged at a back surface of the movable mold platen 14 (the surface on the opposite side with respect to the fixed mold platen).

Also, a gripped portion (not shown) consisting of a plurality of groove-shaped irregularities is formed on an outer periphery surface of the tie bar 16 at the movable mold platen 14 side. A tie bar gripping device 50 that is capable of engaging with and gripping the gripped portion of the tie bar 16 is attached to the movable mold platen 14. Moreover, an ejector 18 that presses a molded body after the injection molding in order to eject it from the movable mold 12 is attached to the movable mold platen 14. This ejector 18 presses the molded body and causes it to be ejected by the advancing and retracting of a rod 18a due to the expansion and contraction operation of an ejector cylinder 27. Note that the present embodiment shows the example of this ejector 18 being driven by a hydraulic cylinder, but this ejector 18 may be driven by either a hydraulic cylinder or driven by an electric actuator.

A mold opening/closing cylinder 19 is attached between a lower portion of the fixed mold platen 13 and the lower portion of the movable mold platen 14 as an actuator for slidably moving the movable mold platen 14. It is constituted so that, by a displacement of the mold opening/closing cylinder 19 in the extension direction, a gap between the fixed mold platen 13 and the movable mold platen 14 widens, and by the displacement of the mold opening/closing cylinder 19 in the contraction direction, the gap between the fixed mold platen 13 and the movable mold platen 14 narrows. At this time, an electric actuator such as an electric motor driven ball screw may be used instead of a hydraulic cylinder as the actuator that causes the movable mold platen 14 to slidably move.

Next, an overview of the operation in the aforementioned injection molding device 1 shall be described.

First, by causing the mold opening/closing cylinder 19 to undergo displacement in the contraction direction, the movable mold platen 14 moves to the fixed mold platen 13 side, and causes the movable mold 12 to come into contact with the fixed mold 11. After or in parallel with causing the movable mold 12 to come into contact with the fixed mold 11, the tie bars 16 and the movable mold platen 14 are coupled by the tie bar gripping device 50. Thereafter, the movable mold 12 is pressure welded to the fixed mold 11 by causing the tie bars 16 to undergo displacement with the mold clamping cylinder 17. Along with injecting the plasticized molding material from the injection unit 2 into the metal mold, the molding material is cooled and molded while applying dwelling pressure.

Next, after causing the movable mold 12 to separate by a minute distance from the fixed mold 11 with the mold clamping cylinder 17, the tie bar gripping device 50 is released to uncouple the tie bars 16 and the movable mold platen 14, and by causing the movable mold platen 14 to move at high speed in the opposite direction of the fixed mold platen 13 by the mold opening/closing cylinder 19, the fixed mold 11 and the movable mold 12 are opened by a sufficient distance in order to take out the molded item.

Thereafter, the molded body that adheres to the movable mold 12 side is pressed and demolded with the ejector 18 from the inner side, and the molded item is removed.

By the above steps, one cycle of forming the molded body from the molding material is completed. In the case of mass production of the molded body, the cycle is repeated.

Next, the hydraulic oil storage device 20 of the aforementioned injection molding device 1 shall be described. The injection molding device 1 is provided with several control elements that drive the injection unit 2 and the mold clamping unit 3 by hydraulic pressure.

Figure 2:
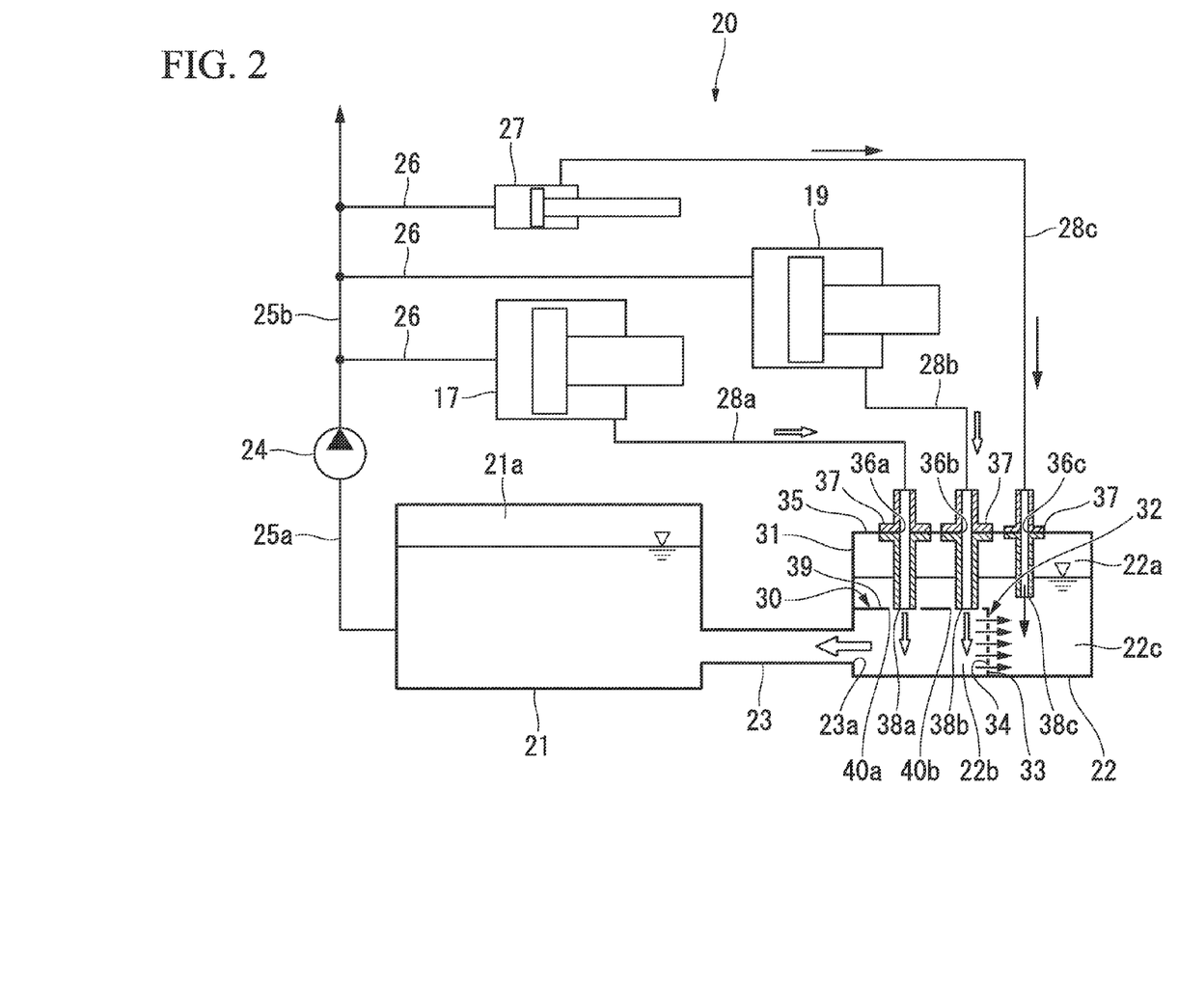
FIG. 2 is an outline configuration drawing of the hydraulic oil storage device in the first embodiment.

As shown in FIG. 1 and FIG. 2, a main tank 21 that stores hydraulic oil for a hydraulic control system is provided in the injection unit 2. A sub-tank 22 that stores hydraulic oil for a hydraulic control system and that has a smaller capacity than the main tank 21 is provided in the mold clamping unit 3. The main tank 21 and the sub-tank 22 constitute the main portions of the hydraulic oil storage device 20. A storage area 21a of the main tank 21 and the storage area 22a of the sub-tank 22 are connected by a coupling tube 23 that constitutes a flow channel for communication. The interior of the main tank 21 and the interior of the sub-tank 22 are brought into communication by this coupling tube 23, whereby the hydraulic oil of the sub-tank 22 can move to the main tank 21.

At this time, it is preferable to provide the coupling tube 23 near the bottom surface of the main tank 21 and the sub-tank 22 that is furthest away from the oil level upper surface, so that movement of the hydraulic oil within the coupling tube 23 is not affected by fluctuations of the oil surface such as waving or the like.

Figure 6A:
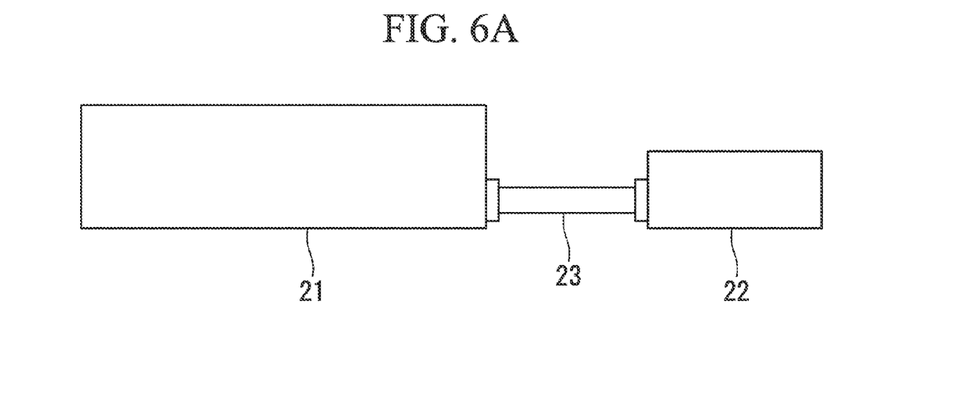
FIG. 6A is a drawing showing a modified example of the coupling tube (one coupling tube) of the first embodiment.
Figure 6B:
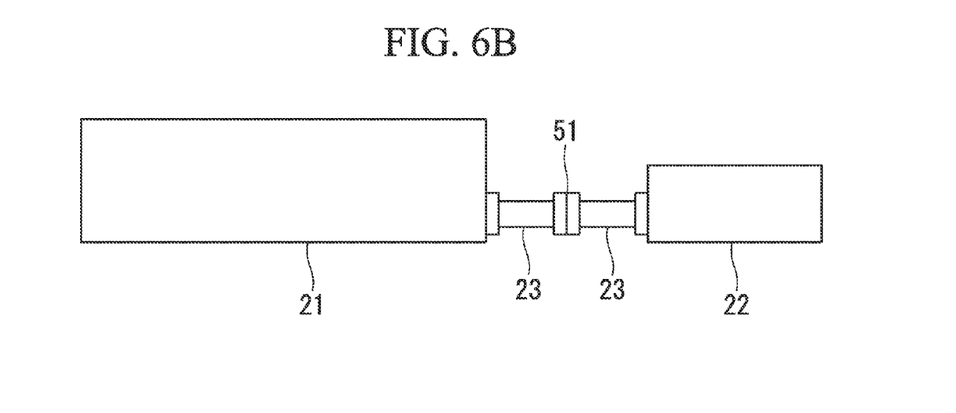
FIG. 6B is a drawing showing a modified example of the coupling tube (a plurality of coupling tubes) of the first embodiment.

The number of coupling tubes 23 that extend from the main tank 21 to the sub-tank 22 may be one or may be a plurality depending on the space from the main tank 21 to the sub-tank 22. Specifically, in the case of there being no space for passing a large-diameter coupling tube between the main tank 21 and the sub-tank 22, it may be substituted with a plurality of coupling tubes with a small diameter that fit in the space. Also, the coupling tube 23 that couples the main tank 21 and the sub-tank 22 may be a single coupling tube as shown in FIG. 6A. Also, the coupling tube 23 may be a coupling tube 23 with a structure that joins tubes divided into a plurality using a joining members 51 such as a flange or coupling member as shown in FIG. 6B. Also, the material of the coupling tube 23 may be metal. Also, the material of the coupling tube 23 may be a hose made of a rubber or textile resilient body. In the case of the coupling tube 23 consisting of divided tubes being spliced together by coupling, or in the case of using a resilient body for the material of the coupling tube 23, during installation of the injection molding device 1, even if the positions of the coupling tube attachment holes of the main tank 21 and the sub-tank 22 have shifted, it is possible to easily attach the coupling tube 23 to the main tank 21 and the sub-tank 22 so that there is no oil leakage.

The sub-tank 22 in one example of this embodiment is generally set to approximately ⅓ to ⅕ of the main tank 21 due to circumstances such as the space that the mold clamping mechanism occupies in the mold clamping unit 3 being large. Preferably, the sub-tank 22 is set to a small capacity of ¼ of the main tank 21. Also, since the main tank 21 and the sub-tank 22 are connected by the coupling tube 23, the hydraulic oil moves via the coupling tube 23 so that the oil levels of the main tank 21 and the sub-tank 22 are the same level. For that reason, the bottom surface heights of the main tank 21 and the sub-tank 22 are set to be approximately the same. It is preferable for the bottom surface heights of the main tank 21 and the sub-tank 22 to be set to be approximately the same in order for the hydraulic oil in the sub-tank 22 to be able to move to the inside of the main tank 21. However, in the case of not being able to install the main tank 21 and the sub-tank 22 with approximately the same bottom surface heights due to the installation space of the sub-tank 22, the bottom surface position of the sub-tank 22 may be made lower or higher than the main tank 21.

A pump 24 that sucks the hydraulic oil that is stored in the main tank 21 via a suction tube 25a and pumps the hydraulic oil to the control elements of the injection unit 2 and the mold clamping unit 3 is connected to the main tank 21. A pumping tube 25b for pumping is connected to the output side of this pump 24. This pumping tube 25b is arranged from the injection unit 2 to the mold clamping unit 3.

The pumping tube 25b is branch-connected to each of the plurality of control elements including the hydraulic cylinder 7 at the injection unit 2 side. First return tubes (not shown) that return to the main tank 21 hydraulic oil that is discharged from the control elements are connected to these control elements. Also, a branch tube 26 that branches to the mold clamping cylinder 17, the mold opening/closing cylinder 19, and the ejector cylinder 27 and the like is connected to the pressure tube 25b at the mold clamping unit 3 side. A control valve (not shown) that controls the supply of the hydraulic oil to each control element is provided at the middle of each branch tube 26. As a result of each control valve being opened from the closed state, the hydraulic oil that has been diverted to each branch tube 26 is pumped to the control elements of the mold clamping cylinder 17, the mold opening/closing cylinder 19, and the ejector cylinder 27 and the like.

At this time, in order to hold down the number of pumping tubes 25b between the injection unit 2 and the mold clamping unit 3, and reduce the burden of the pumping tubes 25b connection work involved in assembling the injection unit 2 and the mold clamping unit 3, after the pumping tube 25b is arranged from the injection unit 2 to the mold clamping unit 3, it is preferable to branch connect it to the mold clamping cylinder 17, the mold opening/closing cylinder 19, and the ejector cylinder 27 and the like.

Second return tubes 28a, 28b, 28c for returning the hydraulic oil to the sub-tank 22 are connected to the mold clamping cylinder 17, the mold opening/closing cylinder 19, and the ejector cylinder 27 and the like. The aforementioned first return tubes and second return tubes 28a to 28c are connected to the main tank 21 or the sub-tank 22. As shown in FIG. 2, the second return tubes 28a to 28c are preferably connected to the sub-tank 22 individually without merging so that their respective back pressures do not affect each other. However, when there is not sufficient space for individually connecting the return tubes to the lid of the sub-tank 22, the second return tube 28a and the second return tube 28b may be connected to the sub-tank 22 after being merged. Note that in FIG. 2, for the convenience of illustration, the second return tubes 28a to 28c are shown in cross-section only in the vicinity of the sub-tank 22, and are elsewhere simplified.

Here, the mold clamping cylinder 17 is set to have a large diameter and small stroke compared to the ejector cylinder 27 or the like. The hydraulic oil that is discharged from the mold clamping cylinder 17 has a high pressure (for example, around 160 kgf/cm$^2$) and a high flow rate. Also, the mold opening/closing cylinder 19 is set to a cylinder with a small diameter compared to the mold clamping cylinder 17. However, since the mold opening/closing cylinder 19 is operated at a high speed and a large stroke, the hydraulic oil that is discharged has a high flow rate compared to the ejector cylinder 27 and the like. For example, in the case of the mold clamping unit 3 that has a mold clamping force of 1,000 to 2,000 t, the discharge amount of hydraulic oil from the mold clamping cylinder 17 becomes around 1,000 to 2,000 liters per minute. In the case of a mold clamping unit 3 that has a mold clamping force of 2,000 to 3,500 t, the discharge amount of hydraulic oil from the mold clamping cylinder 17 becomes around 1,500 to 2,500 liters per minute. In this way, since a large flow rate of around 1,000 to 2,500 liters per minute flows into the sub-tank 22, in a return tube structure with a conventional structure, it becomes a factor in the occurrence of the aforementioned problems such as breakage of the tubes and fluctuation of the hydraulic oil flow state.

The sub-tank 22 has in the interior of the sub-tank 22 a storage region 22a that stores hydraulic oil that is discharged from the second return tubes 28a to 28c, and a connection box 30 that is hollow with an approximately cuboid shape is formed lower than the oil surface of the hydraulic oil that is stored in this storage region 22a. By this connection box 30, a partition portion is constituted that partitions the aforementioned storage region 22a into a first region 22b and a second region 22c. Due to the storage region 22a being partitioned in this way by the connection box 30, within the storage region 22a the first region 22b is formed in the inside of the connection box 30, and the second region 22c is formed on the outside of the connection box 30.

In the sub-tank 22, a flow channel opening portion 23a for the coupling tube 23 is formed in the side wall 31 thereof, and this flow channel opening portion 23a faces the first region 22b in the connection box 30. That is to say, the first region 22b is directly communicated with the coupling tube 23 via the flow channel opening portion 23a. Also, the side wall 31 in which the flow channel opening portion 23a for the coupling tube 23 is formed also serves as the side wall of the aforementioned connection box 30. Note that in one example of this embodiment, a description is given for the case of the side wall 31 that is provided with the flow channel opening portion 23a also serving as the side wall of the connection box 30, but it may be individually formed so as not to have a dual purpose.

In the connection box 30, an internal region communication portion 32 that communicates with the first region 22b and the second region 22c is formed. The internal region communication portion 32 is formed by a plurality of holes 34 that penetrate the side wall 33 of the connection box 30. This plurality of holes 34 are formed in at least one side wall 33, among the side walls of the connection box 30, excepting the side wall 31 in which the flow channel opening portion 23a for the coupling tube 23 is formed. The plurality of holes 34 of the internal region communication portion 32 is set so that the pressure loss that occurs at this plurality of holes 34 is equivalent to the pressure loss that occurs from the coupling tube 23 or greater than that pressure loss. That is to say, by making the resistance to the hydraulic oil flowing out from the first region 22b to the second region 22c greater than the resistance to the hydraulic oil flowing out from the first region 22b to the main tank 21, the amount of hydraulic oil that moves to the main tank 21 through the coupling tube 23 is set to be greater than the hydraulic oil that moves to the second region 22c through the internal region communication portion 32.

At the upper wall 35 of the sub-tank 22, an air breather (not illustrated) serving as an air entrance and exit accompanying the displacement of the oil level is provided, and opening portions 36a to 36c penetrated by the aforementioned second return tubes 28a to 28c are formed. The second return tubes 28a to 28c are each provided with a flange 37 for fixing to the sub-tank 22. As a result of these flanges 37 being coupled to the edges of the opening portions 36a to 36c, the second return tubes 28a to 28c are fixed to the sub-tank 22 in the state of being extended in the vertical direction above and below the opening portions 36a to 36c.

Among the second return tubes 28a to 28c, the second return tubes 28a and 28b are connected to the mold clamping cylinder 17 and the mold opening/closing cylinder 19 of which the flow amounts of the hydraulic oil are relatively large flow amounts. Flow channel outlets 38a and 38b at the lower end of the second return tubes 28a and 28b are arranged so as to face the first region 22b in the connection box 30. More specifically, opening portions 40a and 40b having diameters slightly larger than the second return tubes 28a and 28b are formed in the upper wall 39 of the connection box 30 vertically below the second return tubes 28a and 28b. The lower ends of the second return tubes 28a and 28b, that is to say, the flow channel outlets 38a and 38b, are arranged at positions of the same height as the opening portions 40a and 40b. Thereby, the hydraulic oil that is discharged from the second return tubes 28a and 28b flows into the first region 22b via the opening portions 40a and 40b, respectively.

In contrast, among the second return tubes 28a to 28c, the second return tube 28c is connected to the ejector cylinder 27 of which the flow amount of the hydraulic oil is a relatively small flow amount. The second return tube 28c is provided in an extended manner in the vertical direction in the same manner as the aforementioned second return tubes 28a and 28b. A flow channel outlet 38c of the lower end of this second return channel 28c is arranged in the second region 22c. The flow channel outlet 38c of the second return tube 28c is arranged at a position at which the connection box 30 is not arranged in the direction of emission of the hydraulic oil. Thereby, the hydraulic oil that is discharged from the second return tube 28c flows directly into the second region 22c without having to go through the first region 22b.

Accordingly, with the hydraulic oil storage device 20 in the aforementioned first embodiment, the hydraulic oil of the main tank 21 that is sucked by the suction tube 25a can flow into the first region 22b of the sub-tank 22 via the second return tubes 28a to 28c. Then, as a result of the main tank 21 and the sub-tank 22 being brought into communication by the coupling tube 23, it is possible to cause the hydraulic oil of the sub-tank 22 to move to the main tank 21 via the coupling tube 23 by the pressure differential that arises in accordance with the respective heights of the oil level of the main tank 21 and the oil level of the sub-tank 22.

Moreover, due to the constitution that partitions the storage region 22a of the sub-tank 22 into a first region 22b (including the flow channel opening portion 23a for the coupling tube 23) and the second region 22c with the connection box 30 so as to cause the hydraulic oil of the second return tubes 28a and 28b to flow into the first region 22b, the internal pressure of the first region 22b is made to rise by the flowing in of the hydraulic oil. By utilizing this rise in the internal pressure, it is possible to speed up the flow velocity of the hydraulic oil that moves from the sub-tank 22 to the main tank 21 via the coupling tube 23.

Since the pressure loss due to the internal region communication portion 32 is set to be the same as the pressure loss of the coupling tube 23 or greater than that pressure loss, the hydraulic oil in the first region 22b can be made to move to the second region 22c via the internal region communication portion 32 more gradually than the hydraulic oil of the sub-tank 22 moving to the main tank 21 via the coupling tube 23. For that reason, by suppressing a sudden increase in the oil level within the sub-tank 22, it is possible to suppress pressure fluctuations due to changes in the oil level.

Also, since the second return tubes 28a and 28b are connected to the sub-tank 22 so that the flow channel outlets 38a and 38b face the interior of the first region 22b, there is no need to bend the second return tubes 28a and 28b, and so it is possible to prevent the bending moment from acting on the second return tubes 28a and 28b due to the discharge reaction force of the hydraulic oil. Moreover, compared to the case of guiding the second return tubes 28a and 28b into the coupling tube 23, since it is possible to shorten the lengths of the second return tubes 28a and 28b, even in the case of vibration being induced at the second return tubes 28a and 28b by a vortex that is generated by the discharge of the hydraulic oil, it is possible to keep the bending moment to a minimum due to the vibration. As a result, it is possible to prevent an increase in the load on fixing members such as the flange 37, which fixes the second return tubes 28a and 28b, due to the bending moment and excessive vibration, leading to the occurrence of breakage and loosening or breakage of screws for fastening (not shown). Also, it is possible to prevent the overflowing of oil from the air breather.

Also, since the coupling tube 23 is not arranged in the vicinity of the flow channel outlets 38a and 38b of the second return tubes 28a and 28b, in the event of hydraulic oil being discharged from the second return tubes 28a and 28b, it is possible to suppress a reduction in pressure around the flow channel outlets 38a and 38b due to the Venturi effect. As a result, it is possible to prevent the occurrence of cavitation.

Moreover, since it is possible to reduce the flow velocity of the hydraulic oil that moves from the first region 22b to the second region 22c in the sub-tank 22 by the internal region communication portion 32 being formed by a plurality of holes 34 that are formed in the side wall 33, it is possible to suppress oil level fluctuations that are caused by the hydraulic oil swirling upward in the sub-tank 22.

Also, among the plurality of second return tubes 28a to 28c, only the flow channel outlets 38a and 38b of the second return tubes 28a and 28b are arranged so as to face the inside of the first region 22b, thereby facilitating maintenance of a high pressure in the first region 22b by the hydraulic oil of the second return tubes 28a and 28b. In contrast, since it is possible to return the hydraulic oil of the second return tube 28c to the second region 22c in which there is little rise in the flow resistance and pressure, it is possible to keep at a low level the back pressure of the ejector cylinder 27 that is the control element that the second return tube 28c is connected to. As a result, it is possible to operate a small control element with high accuracy.

Since the flow channel outlets 38a and 38b are arranged at positions of approximately the same height of the opening portions 40a and 40b of the connection box 30, and the second return tubes 28a and 28b are not fixed to the connection box 30, it is possible to easily carry out attachment work of the second return tubes 28a and 28b and maintenance work of the connection box 30.

Also, although the oil level of the sub-tank 22 easily rises suddenly with an inflow of hydraulic oil by forming the sub-tank 22 to be smaller than the main tank 21, by providing the constitution of the aforementioned connection box 30, it is possible to inhibit a sudden rise of the oil level in the sub-tank 22. And, by forming the sub-tank 22 to be smaller than the main tank 21 in this manner, it is possible to hold down the hydraulic oil amount that is used in the entire injection molding device 1 while maintaining the required oil level height in the main tank 21.

Figure 3:
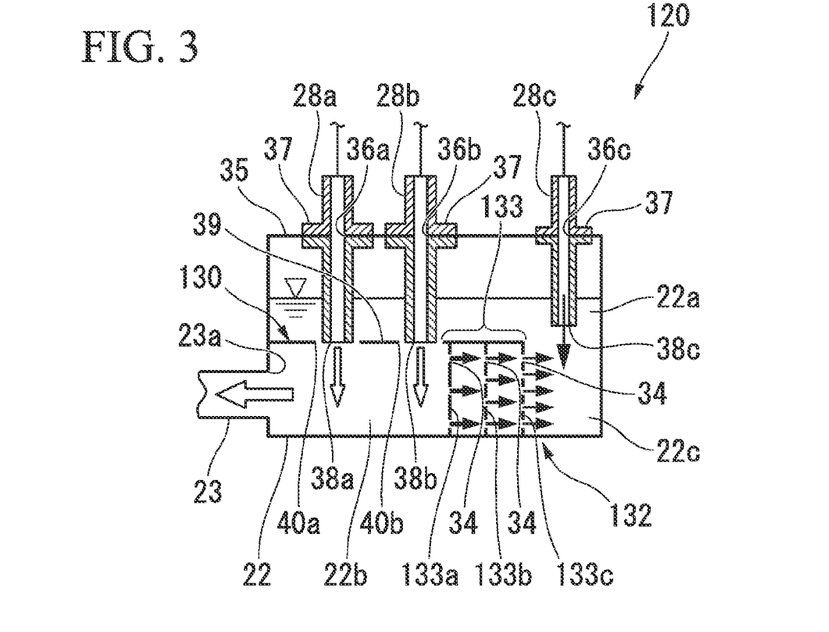
FIG. 3 is an outline configuration drawing of the sub-tank in the second embodiment.

Next, the hydraulic oil storage device 120 in the second embodiment of the invention shall be described with reference to the drawings. Note that the hydraulic oil storage device 120 in this second embodiment differs from the hydraulic oil storage device 20 of the aforedescribed first embodiment only with respect to the constitution of the internal region communication portion 32. For that reason, it shall be described by assigning the same portions as the first embodiment with the same reference numerals, and omitting overlapping descriptions.

As shown in FIG. 3, a connection box 130 that partitions the storage region 22a into a first region 22b and a second region 22c is provided in the sub-tank 22 of the hydraulic oil storage device 120 in this embodiment. In this connection box 130, in the same manner as the connection box 30 of the aforementioned first embodiment, the flanges 37 of the second return tubes 28a to 28c are fixed to the edges of the opening portions 36a to 36c of the upper wall 35, whereby the second return tubes 28a to 28c are fixed to the sub-tank 22 in the state of being extended in the vertical direction above and below the opening portions 36a to 36c.

Opening portions 40a and 40b having diameters slightly larger than the second return tubes are formed in the upper wall 39 of the connection box 130 vertically below the second return tubes 28a and 28b. The flow channel outlets 38a and 38b of the aforementioned second return tubes 28a and 28b are arranged at positions of approximately the same height as these opening portions 40a and 40b.

A multi-stage wall 133 is formed in the connection box 130. This multi-stage wall 133 is constituted by a plurality of side walls 133a to 133c that are arranged spaced apart by a predetermined interval in the thickness direction. A plurality of holes 34 that constitute an internal region communication portion 132 are formed in the plurality of side walls 133a to 133c. The flow passage area per hole is formed smaller the further toward the outer side of the multi-stage wall 133 it is formed. That is to say, the holes 34 that are formed in the side wall 133a have the largest flow passage area, while the holes 34 that are formed in the side wall 133c have the smallest flow passage area. The pressure loss due to the holes 34 that are formed in this multi-stage wall 133 is set so as to be the same as the pressure loss that occurs at the coupling tube 23 or greater than that pressure loss. Note that the internal region communication portion 132 that brings the first region 22b and the second region 22c into communication is formed by the multi-stage wall 133 and the holes 34.

Here, as for the holes 34 that are formed in the side walls 133a to 133c, a total flow passage area of the holes 34 in each of the side walls 133a to 133c is preferably set to be approximately the same. Alternatively, with regard to the holes 34 that are formed in each of the side walls 133a to 133c, it is preferable that they be formed as large as those formed in the outer side of the side wall 133c. By doing so, the resistance to the hydraulic oil between the side walls of the multi-stage wall 133 is kept down, and it is possible to stabilize the flow of the hydraulic oil. Moreover, since the pressure at each stage of the multi-stage wall 133 is made uniform, it is possible to lower the rigidity of the side walls 133a to 133c of the multi-stage wall 133. As a result, it is possible to achieve a cost reduction by reducing the plate thickness per side wall of the multi-stage wall 133. Note that in FIG. 3, for the convenience of illustration, the case is shown of the multi-stage wall 133 being constituted by the three side walls 133a to 133c, but it is not limited to three, and two or four or more side walls may also be provided.

Also, with regard to the positions of the holes 34 in the side walls 133a to 133c of the multi-stage wall 133, they are preferably provided at different positions to the extent possible. That is to say, the hydraulic oil that flows out from the holes 34 of the side wall 133a does not directly flow into the holes 34 of the side wall 133b, and instead, after once hitting the wall of the side wall 133b, flows into the nearby holes 34. Similarly, the hydraulic oil that flows out from the holes 34 of the side wall 133b does not directly flow into the holes 34 of the side wall 133c, and instead, after once hitting the wall of the side wall 133c, flows into the nearby holes 34, and afterward gushes to the second region 22c. By constituting in this manner, in addition to lessening the velocity of the hydraulic oil from the first region 22b at the multi-stage side wall 133, it is possible to cause the hydraulic oil to be ejected to the second region 22c after being sufficiently rectified.

Accordingly, by means of the hydraulic oil storage device 120 of the foregoing second embodiment, along with being able to keep down the intensity of the hydraulic oil that gushes into the second region 22c by the internal region communication portion 132, it is possible to prevent inconsistencies in the intensity of the hydraulic oil that gushes into the second region 22c. Above all, even in the case of the gap being small between the side wall 133c of the connection box 130 where the internal region communication portion 132 is formed and the side wall of the sub-tank 22, it is advantageous on the point of being able to suppress fluctuations of the oil level of the sub-tank 22 due to the hydraulic oil that gushes out from the holes 34 swirling upward.

Also, since the internal region communication portion 132 is formed in multiple stages, it is possible to attenuate within the connection box 130 the oscillation waves caused by the hydraulic oil flowing into the connection box 130. For that reason, it is possible to prevent fluctuation factors such as pulsing motions remaining in the hydraulic oil due to the propagation of oscillation waves to the hydraulic oil of the second region 22c.

Moreover, since the internal region communication portion 132 is formed in multiple stages, it is possible to disperse the pressure loss of the hydraulic oil at each stage. For that reason, it is possible to suppress sudden drops in pressure when the hydraulic oil passes through the holes 34, and so it is possible to prevent the generation of air bubbles in the hydraulic oil.

Figure 4:
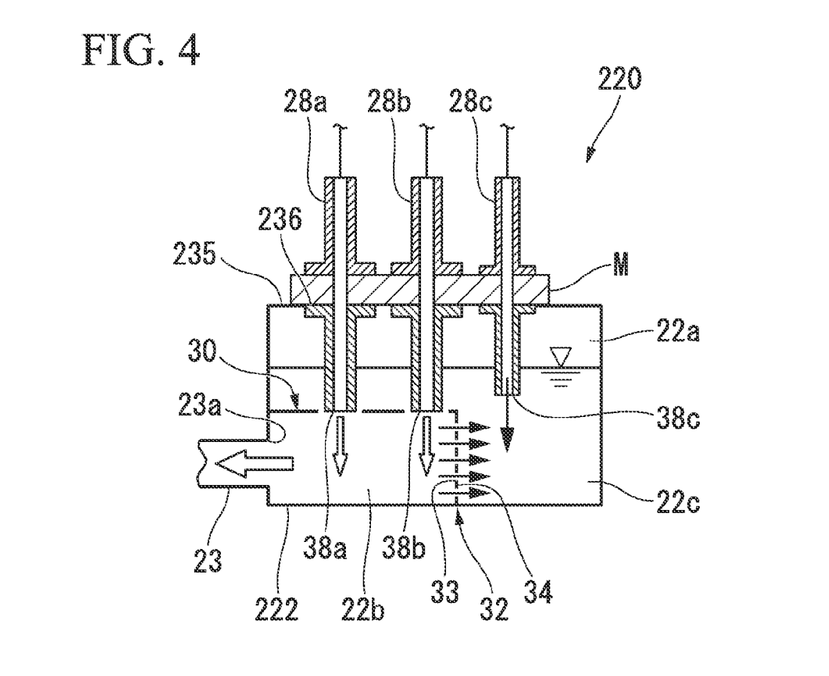
FIG. 4 is an outline configuration drawing of the sub-tank in the third embodiment.

Next, the hydraulic oil storage device 220 in the third embodiment of the invention shall be described with reference to the drawings. Note that the hydraulic oil storage device 220 in this third embodiment differs from the hydraulic oil storage device 20 of the aforedescribed first embodiment only with respect to the mounting structure of the second return tubes 28a to 28c. For that reason, it shall be described by assigning the same portions as the first embodiment with the same reference numerals.

As shown in FIG. 4, a connection box 30 that partitions the storage region 22a into a first region 22b and a second region 22c is formed in the sub-tank 222 of the hydraulic oil storage device 220 in this embodiment, similarly to the first embodiment described above. The internal region communication portion 32 in which the plurality of holes 34 are formed is formed in the side wall 33 is formed in this connection box 30.

In contrast, an upper portion opening 236 is formed in the sub-tank 222. This upper portion opening 236 is blocked by a hydraulic manifold M that is a tube coupling member.

The hydraulic manifold M is a member that integrally forms within a metal block a hydraulic circuit on the mold clamping unit 3 side, and is constituted by including hydraulic tubing and control valves (for example, a pressure control valve, a flow rate control valve, and the like). Various branch tubes 26 that are connected to the pressure tubes 25b, and the rod side oil chamber and head side of the pressure mold clamping cylinder 17 and the mold opening/closing cylinder 19 are respectively connected to the hydraulic manifold M. The hydraulic manifold M and the sub-tank 222 are fixed by bolt fastening members (not shown), and the upper portion opening 236 is blocked by the hydraulic manifold M.

Moreover, second return tubes 28a, 28b, 28c that are connected to the pressure mold clamping cylinder 17, the mold opening/closing cylinder 19, and the ejector cylinder 27 are provided in the vertical direction at the hydraulic manifold M. Note that in FIG. 4, the second return tubes 28a to 28c are connected to the upper surface portion of the hydraulic manifold M. However, provided the flow channel outlets 38a to 38c are arranged below the hydraulic manifold M, the second return tubes 28a to 28c may be connected to the side surface portion of the hydraulic manifold M. In this case, the hydraulic oil flow channels of the hydraulic manifold M have a shape bent downward from the side.

These second return tubes 28a to 28c are attached to the hydraulic manifold M prior to the hydraulic manifold M being attached to the sub-tank 222. That is to say, at the point in time at which the work of attaching the hydraulic manifold M to the sub-tank 222 is complete, the state arises in which the second return tubes 28a to 28c are attached to the sub-tank 222. Note that the arrangement of the second return tubes 28a to 28c and the arrangement of the flow channel outlets 38a and 38b are the same as the first embodiment described above, and so detailed descriptions thereof shall be omitted.

Here, the hydraulic manifold M is formed with a metal block that has thicker walls and greater rigidity compared to the upper wall 235 of the sub-tank 222, and it weighs more than the upper wall 235 that has the same surface area. Note that in the case of the mold clamping force being 1,000 to 2,000 t, the weight of the hydraulic manifold M is around 800 kg. Also, in the case of the mold clamping force being 2,500 to 3,500 t, it has a weight of around 1,100 kg. Furthermore, in the case of the mold clamping force being 1,000 to 2,000 t, the tube diameters of the second return tubes 28a and 28b are around $\phi$60 to 80. Also, in the case of the mold clamping force being 2,500 to 3,500 t, they have a diameter of around $\phi$80 to 100. At this time, the tube diameter of the second return tubes 28a and 28b is preferably set so that the pressing force due to the weight of the hydraulic manifold M exceeds the discharge reaction force of the hydraulic oil.

Accordingly, according to the hydraulic oil storage device 220 in the third embodiment, it is possible to connect the second return tubes 28a to 28c to the sub-tank 222 just by attaching the hydraulic manifold M to the sub-tank 222. For that reason, assembly work within the sub-tank 222 is unnecessary, and it is possible to lessen the burden of the assembly work of the second return tubes 28a to 28c.

Moreover, since the second return tubes 28a and 28b are integrally connected to the hydraulic manifold M that has high rigidity, by enhancing the assembly rigidity of the second return tubes 28a and 28b, it is possible to prevent the occurrence of swinging at the second return tubes 28a and 28b. Also, since it is possible to eliminate the external tubing and joints that connect the hydraulic manifold M and the sub-tank 222, it is possible to achieve leakage prevention of the hydraulic oil, a cost reduction due to a lower parts count, and a reduction in size.

By attaching the hydraulic manifold M that is a heavy object to which various control valves are attached to the sub-tank 222, it is possible to shift the natural frequencies of the sub-tank 222 and the second return tubes 28a to 28c to higher frequencies, so it is possible to prevent sympathetic vibration due to low-frequency pulsing that is generated from the flow of the hydraulic oil.

Furthermore, due to the weight of the hydraulic manifold M, it is possible to counter the discharge reaction force of the hydraulic oil. In particular, since the load on the edge of the upper portion opening 236 of the sub-tank 222 due to the discharge reaction force of the hydraulic oil decreases, it is possible to improve the design freedom in relation to the strength design of the sub-tank 222.

Note that the present invention is not limited to the constitutions described above, and design modifications can be made within a scope that does not depart from the spirit of the present invention.

For example, the embodiments were described in the case of the connection box 30, 130 having approximately cuboid shapes, but they are not limited to this shape. For example, they may also be formed in a box shape having curved surfaces.

Also, in each of the embodiments given above, a description was given for the case of the flow channel outlets 38a and 38b of the second return tubes 28a and 28b being arranged so as to face the first region 22b, but they are not limited thereto. For example, the flow channel outlet 38c of the second return tube 28c that has a relatively small flow amount may be arranged so as to face the first region 22b.

In addition, in each of the embodiments given above, a description was given for the case of the flow channel outlets 38a and 38b being arranged at the same height position as the opening portions 40a and 40b of the connection box 30 and 130, but they are not limited to this constitution. For example, the positions of the flow channel outlets 38a and 38b may also be in the vicinity of the opening portions 40a and 40b. Also, the flow channel outlets 38a and 38b may be arranged further to the inside of the first region 22b than the opening portions 40a and 40b. In the case of arranging the flow channel outlets 38a and 38b more to the inside of the first region 22b than the opening portions 40a and 40b, since the hydraulic oil that is returned to the sub-tank 22, 122 reliably flows into the first region 22b from the flow channel outlets 38a and 38b, it is possible to reliably make the first region 22b have a positive pressure, and as a result, it is possible to reliably increase the flow velocity of the hydraulic oil within the coupling tube 23.

In each of the embodiments given above, a description was given for the case of forming the holes 34 of the internal region communication portion 32, 132 in the side wall 33 of the connection box 30, 130 and the multi-stage wall 133, but the holes 34 of the internal region communication portion 32 may also be formed in the upper wall 39 of the connection box 30 and 130. Also, a description was given with the ejector cylinder 27 serving as an example of a small control element, but besides the ejector cylinder 27, hydraulic oil of other control elements with a small emission flow volume of hydraulic oil may be returned to the second region 22c, and furthermore, hydraulic oil of a plurality of control elements with a small discharge flow volume such as the ejector cylinder 27 may be returned to the second region 22c.

Moreover, in the second embodiment given above, a description was given for the example of the holes 34 that are formed in the side walls of the multi-stage wall 133 being smaller the further toward the outer side, but all of the holes 34 may be set to an equivalent size.

Also, in the third embodiment given above, the connection box 130 of the second embodiment may be applied to the inside of the sub-tank 22.

Moreover, in the third embodiment, the case was described of using the hydraulic manifold M as a tube coupling member that integrally connects the plurality of second return tubes 28a to 28c, but provided it integrally connects the plurality of second return tubes 28a to 28c and its rigidity is higher than the upper wall 235 of the sub-tank 22, it is not limited to the hydraulic manifold M. For example, a simple metal block may be used.

Moreover, in the embodiments given above, the example was described of providing the hydraulic oil storage device 20, 120, 220 in the injection molding device 1, but it may also be applied to a device other than the injection molding device 1.

The invention is not to be considered as being limited by the foregoing description, and is only limited by the scope of the appended claims.

What is claimed is:

1. A hydraulic oil storage device comprising:
    a main tank being connected with a suction tube that suctions hydraulic oil;
    a sub-tank being connected with a return tube that returns the hydraulic oil suctioned by the suction tube; and
    a coupling tube that connects the main tank and the sub-tank; wherein
    the sub-tank is provided with a partition portion that partitions a storage region of the sub-tank into a first region and a second region other than the first region;
    the partition portion is provided with an internal region communication portion that brings the first region and the second region into communication, and causes a pressure loss equal to or greater than the pressure loss of the coupling tube;
    the first region is directly communicated with the coupling tube through a flow channel opening portion of the coupling tube, a flow path between a flow channel outlet of the return tube and the flow channel opening portion of the coupling tube is formed to have a constant cross-sectional area;
    the return tube is connected to the sub-tank so that the flow channel outlet of the return tube faces the first region;
    a plurality of the return tubes are provided, and among the plurality of return tubes, the flow channel outlet of a first return tube of the return tubes is arranged so as to open in the interior of the first region,
    the flow channel outlet of a second return tube of the return tubes is arranged so as to open in the interior of the second region, and
    the flow amount of hydraulic oil of the second return tube is less than the flow amount of hydraulic oil of the first return tube.

2. The hydraulic oil storage device according to claim 1, wherein the coupling tube is constituted by one coupling tube.

3. The hydraulic oil storage device according to claim 1, wherein the coupling tube is constituted by a plurality of coupling tube.

4. The hydraulic oil storage device according to claim 1, wherein the internal region communication portion is constituted from a plurality of holes that are formed in the partition portion.

5. The hydraulic oil storage device according to claim 4, wherein the internal region communication portion is provided in multiple stages between the first region and the second region.

6. The hydraulic oil storage device according to claim 5, wherein the size of the plurality of holes that are provided in multiple stages between the first region and the second region is formed equivalent to the holes of the first region side.

7. The hydraulic oil storage device according to claim 5, wherein the size of the plurality of holes that are provided in multiple stages between the first region and the second region is formed smaller the further toward the second region side.

8. The hydraulic oil storage device according to claim 1, wherein the plurality of return tubes are integrally connected to a tube coupling member having higher rigidity than the wall portions of the sub-tank, and the upper portion opening of the sub-tank is blocked by the tube coupling member.

9. The hydraulic oil storage device according to claim 8, wherein the tube coupling member is a hydraulic manifold.

10. An injection molding device comprising:
    the hydraulic oil storage device according to any one of claims 1-7 and 8-9.

11. The hydraulic oil storage device according to claim 1, wherein the partition portion is provided with a side wall that faces a wall which is formed with the flow channel opening portion,
    the internal region communication portion includes the side wall, and is formed with a plurality of holes which are provided on the side wall, and
    a size of the flow channel opening portion is larger than a size of the plurality of holes.

* * * * *